US012659939B2

(12) United States Patent
Liu et al.

(10) Patent No.: US 12,659,939 B2
(45) Date of Patent: Jun. 16, 2026

(54) SYSTEMS AND METHODS FOR MANAGING FREQUENCY RESOURCE GROUP BASED SERVICE TRANSMISSIONS

(71) Applicant: ZTE CORPORATION, Shenzhen (CN)

(72) Inventors: Xing Liu, Shenzhen (CN); Peng Hao, Shenzhen (CN); Xingguang Wei, Shenzhen (CN); Shuaihua Kou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 373 days.

(21) Appl. No.: 18/521,748

(22) Filed: Nov. 28, 2023

(65) Prior Publication Data

US 2024/0163857 A1     May 16, 2024

Related U.S. Application Data

(63) Continuation of application No. PCT/CN2021/136710, filed on Dec. 9, 2021.

(51) Int. Cl.
  *H04W 72/044* (2023.01)
  *H04W 72/0453* (2023.01)
  *H04W 72/20* (2023.01)

(52) U.S. Cl.
  CPC ....... *H04W 72/0453* (2013.01); *H04W 72/20* (2023.01)

(58) Field of Classification Search
  CPC ....... H04L 5/001; H04L 5/003; H04L 5/0048; H04W 72/23; H04W 72/20; H04W 72/0453
  See application file for complete search history.

(56) References Cited

U.S. PATENT DOCUMENTS

| | | | |
|---|---|---|---|
| 10,887,877 | B2 | 1/2021 | Zhang et al. |
| 11,412,503 | B2 | 8/2022 | Chen et al. |
| 12,426,099 | B2 | 9/2025 | Watts et al. |
| 2019/0104543 | A1 | 4/2019 | Park |
| 2019/0357085 | A1 | 11/2019 | Chervyakov et al. |
| 2019/0364602 | A1 | 11/2019 | Yi et al. |
| 2020/0045745 | A1 | 2/2020 | Cirik et al. |

(Continued)

FOREIGN PATENT DOCUMENTS

| | | |
|---|---|---|
| CN | 109788560 A | 5/2019 |
| CN | 111741528 A | 10/2020 |

(Continued)

OTHER PUBLICATIONS

Ericsson, "Mechanisms to support MBS group scheduling for RRC_CONNECTED UEs," 3GPP TSG-RAN WG1 Meeting #104bis-e; R1-2103738; Apr. 12-20, 2021; e-Meeting (24 pages).

(Continued)

*Primary Examiner* — Syed Ali

(74) *Attorney, Agent, or Firm* — Foley & Lardner LLP

(57)     ABSTRACT

Example implementations include receiving, by a wireless communication device from a network, first indication indicating a first First Type Frequency Resource (FTFR) and at least one Second Type Frequency Resource (STFR) mapped to the first FTFR. The wireless communication device communicates with the network using the first FTFR and the at least one STFR mapped to the first FTFR.

16 Claims, 10 Drawing Sheets

(56) References Cited

U.S. PATENT DOCUMENTS

| 2020/0328867 | A1 |  | 10/2020 | Shi |  |
| 2021/0119745 | A1 |  | 4/2021 | Li et al. |  |
| 2021/0250920 | A1 |  | 8/2021 | Kim et al. |  |
| 2022/0322407 | A1 |  | 10/2022 | Sakhnini et al. |  |
| 2022/0416976 | A1 | * | 12/2022 | Baek | H04L 5/0051 |
| 2023/0022606 | A1 | * | 1/2023 | Liu | H04L 5/0048 |
| 2023/0179271 | A1 | * | 6/2023 | Abotabl | H04B 7/0689 |
|  |  |  |  |  | 375/262 |
| 2023/0189234 | A1 | * | 6/2023 | Hou | H04W 72/0453 |
|  |  |  |  |  | 370/329 |
| 2023/0189235 | A1 | * | 6/2023 | Zheng | H04W 72/23 |
|  |  |  |  |  | 370/329 |
| 2023/0189308 | A1 | * | 6/2023 | Choi | H04W 74/0833 |
| 2023/0239851 | A1 | * | 7/2023 | Abotabl | H04W 72/0453 |
|  |  |  |  |  | 370/329 |
| 2023/0247588 | A1 | * | 8/2023 | Liu | H04W 72/02 |
|  |  |  |  |  | 370/329 |
| 2023/0247627 | A1 | * | 8/2023 | Choi | H04W 72/1268 |
| 2023/0262673 | A1 | * | 8/2023 | Xuan | H04W 72/0453 |
|  |  |  |  |  | 370/329 |
| 2023/0318896 | A1 | * | 10/2023 | Fu | H04L 5/0051 |
|  |  |  |  |  | 370/329 |
| 2024/0064722 | A1 | * | 2/2024 | Hou | H04W 74/0833 |
| 2024/0291608 | A1 | * | 8/2024 | Jiang | H04W 52/367 |
| 2024/0292446 | A1 | * | 8/2024 | Zhang | H04B 17/345 |
| 2024/0298342 | A1 | * | 9/2024 | Jiang | H04L 5/00 |

FOREIGN PATENT DOCUMENTS

| CN | 112351500 | A | 2/2021 |
| EP | 3 573 406 | A1 | 11/2019 |
| EP | 3 716 716 | A1 | 9/2020 |
| WO | WO-2018/084544 | A1 | 5/2018 |
| WO | WO-2023/011255 | A1 | 2/2023 |

OTHER PUBLICATIONS

International Search Report and Written Opinion for PCT Appl. No. PCT/CN2021/136704, mailed on Sep. 6, 2022 (6 pages).

International Search Report and Written Opinion for PCT Appl. No. PCT/CN2021/136728, mailed on Sep. 8, 2022 (7 pages).

International Search Report and Written Opinion for PCT Appl. No. PCT/CN2021/136800, mailed on Sep. 7, 2022 (8 pages).

International Search Report and Written Opinion on PCT/CN2021/136710 dated Sep. 7, 2022 (8 pages).

ZTE, "Consideration on potential further enhancement for MBS", 3GPP TSG RAN WG1 #106b-e, R1-2108854, Oct. 19, 2021, e-Meeting (6 pages).

ZTE, "Consideration on potential further enhancement for MBS," 3GPP TSG RAN WG1 #106-e; R1-2106748; Aug. 16-27, 2021; e-Meeting (5 pages).

ZTE, "Consideration on potential further enhancement for MBS," 3GPP TSG RAN WG1 #106b-e; R1-2108854; Oct. 11-19, 2021; e-Meeting (6 pages).

ZTE, "Consideration on potential further enhancement for MBS," 3GPP TSG RAN WG1 #107-e; R1-2110913; Nov. 11-19, 2021; e-Meeting (6 pages).

ZTE, et al., "Discussion on MBS Enhancement in Rel-18," 3GPP TSG RAN Meeting #93-e; RP-212392; Sep. 13-17, 2021; Electronic Meeting (13 pages).

Extended European Search Report for EP Appl. No. 21966732.6, dated Mar. 3, 2025 (10 pages).

Non-Final Office Action on U.S. Appl. No. 18/506,238 DTD Nov. 14, 2025.

Non-Final Office Action on U.S. Appl. No. 18/517,645 DTD Dec. 31, 2025.

* cited by examiner

300

First
Frequency
Range 310

Second
Frequency
Range 320

Frequency

Time

Downlink

Uplink

PDCCH 350

PUSCH 340

400

| Value of BWP Indicator Field | BWP |
|---|---|
| 2 bits | |
| 00 | Configured BWP with BWP-Id = 1 |
| 01 | Configured BWP with BWP-Id = 2 |
| 10 | Configured BWP with BWP-Id = 3 |
| 11 | Configured BWP with BWP-Id = 4 |

| FTFR Index | STFR Index |
|:---:|:---:|
| 1 | 1, 2 |
| 2 | 1 |
| 3 | 3 |
| 4 | 4 |

600

| FTFR BWP Index | STFR BWP Index |
|:---:|:---:|
| 1 | 5 |
| 2 | 6 |
| 3 | 7 |
| 4 | 8 |

700

800

| Value of Resource Indicator Field 2 bits | Frequency Resources |
|---|---|
| 00 | FTFR |
| 01 | STFR with STFR-Id = 1 |
| 10 | STFR with STFR-Id = 2 |
| 11 | STFR with STFR-Id = 3 |

900

| Value of BWP indicator field 1 bit | Frequency Resources |
|---|---|
| 0 | BWP index = 1 (FTFR) |
| 1 | BWP index = 2 (FTFR) |

| Value of BWP Indicator Field | Frequency Resources |
|---|---|
| 2 bits | |
| 00 | BWP index = 1 (FTFR) |
| 01 | BWP index = 2 (STFR) |
| 10 | BWP index = 3 (STFR) |
| 11 | BWP index = 4 (STFR) |

| Value of BWP Indicator Field | Frequency Resources |
|---|---|
| 3 bits | |
| 000 | BWP index = 1 (FTFR) |
| 001 | BWP index = 2 (STFR) |
| 010 | BWP index = 3 (STFR) |
| 011 | BWP index = 4 (STFR) |
| 100 | BWP index = 5 (FTFR) |
| 101 | BWP index = 6 (STFR) |
| 110 | BWP index = 7 (STFR) |
| 111 | BWP index = 8 (STFR) |

Frequency
→ Time

Downlink
Uplink
SPS Downlink Transmission

1400

| Value of BWP Indicator Field or Resource Indicator Field | Frequency Resources |
|---|---|
| 2 bits | |
| 00 | BWP index = 1 (or FTFR-Id 1) |
| 01 | BWP index = 2 (or FTFR-Id 2) |
| 10 | BWP index = 3 (or FTFR-Id 3) |
| 11 | BWP index = 4 (or FTFR-Id 4) |

UE 104a

600

BS 102

1620

Receving first indication indicating first FTFR and at least one STFR mapped to the first FTFR

1610

Sending first indication indicating first FTFR and at least one STFR mapped to the first FTFR

1640

Communicating with BS using first FTFR and at least one STFR mapped to first FTFR

1630

Communicating with UE using first FTFR and at least one STFR mapped to first FTFR

SYSTEMS AND METHODS FOR MANAGING FREQUENCY RESOURCE GROUP BASED SERVICE TRANSMISSIONS

CROSS-REFERENCE TO RELATED APPLICATIONS

This application claims the benefit of priority under 35 U.S.C. § 120 as a continuation of PCT Patent Application No. PCT/CN2021/136710, filed on Dec. 9, 2021, the disclosure of which is incorporated herein by reference in its entirety.

TECHNICAL FIELD

The present implementations relate generally to wireless communications, and more particularly to systems, methods, apparatuses, and non-transitory computer-readable media for managing frequency resource group based service transmissions.

BACKGROUND

Currently, the first phase standardization of the 5th Generation mobile communication technology (5G) has already completed. A series of unicast and multicast features had been specified in the first three New Radio (NR) releases, Rel-15, Rel-16 and Rel-17. Future releases relate to receiving multiple transmission services at the same time.

SUMMARY

In some arrangements, a wireless communication device receives from a network, first indication indicating a first First Type Frequency Resource (FTFR) and at least one Second Type Frequency Resource (STFR) mapped to the first FTFR. The wireless communication device communicates with the network using the first FTFR and the at least one STFR mapped to the first FTFR.

In some arrangements, a network sends to a wireless communication device, first indication indicating a first First Type Frequency Resource (FTFR) and at least one Second Type Frequency Resource (STFR) mapped to the first FTFR. The network communicates with the wireless communication device using the first FTFR and the at least one STFR mapped to the first FTFR.

The above and other aspects and their implementations are described in greater detail in the drawings, the descriptions, and the claims.

BRIEF DESCRIPTION OF THE DRAWINGS

These and other aspects and features of the present implementations is apparent to those ordinarily skilled in the art upon review of the following description of specific implementations in conjunction with the accompanying figures, wherein.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations is described, and detailed descriptions of other portions of such known components is omitted so as not to obscure the present implementations. Implementations described as being implemented in software should not be limited thereto, but can include implementations implemented in hardware, or combinations of software and hardware, and vice-versa, as is apparent to those skilled in the art, unless otherwise specified herein. In the present specification, an implementation showing a singular component should not be considered limiting. Rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

In some arrangements, a User Equipment (UE) may receive Multicast Broadcast Services (MBSs) and unicast services may receive simultaneously in a cell. Under full duplex or flexible duplex, a UE is can receive and transmit signals simultaneously or switch between reception and transmission without delay. In multi-band-one-cell/carrier settings, a UE receive or send signals in different bands/carriers which belong to a single cell. In these scenarios, multiple services need to be transmitted in parallel in the same cell. to the present arrangements relate to systems, methods, apparatuses, and non-transitory processor-readable media for coordinating or configuring concurrent services.

Figures 1, 2:
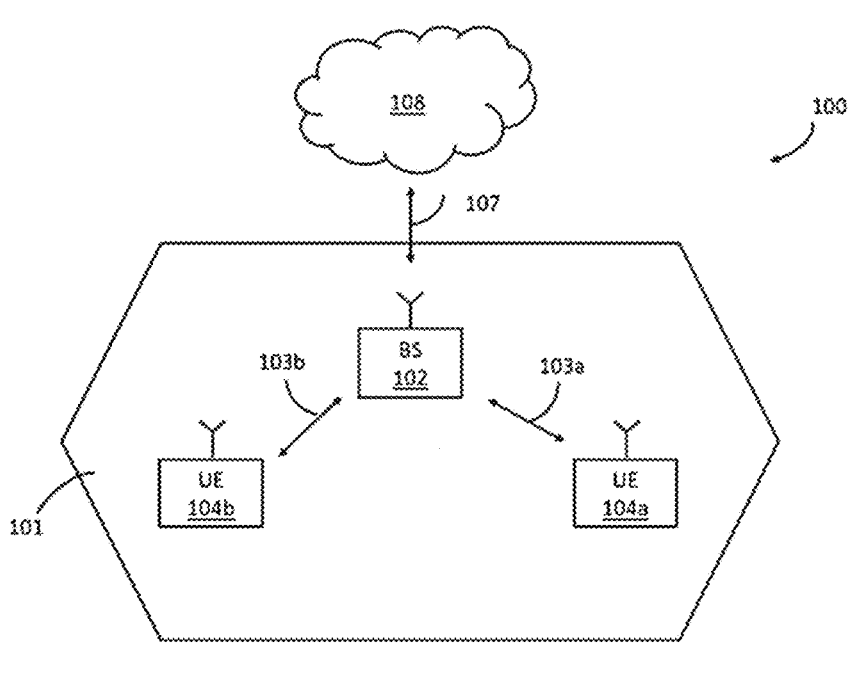
FIG. 1 is a diagram illustrating an example wireless communication network, according to various arrangements.
FIG. 2 is a diagram illustrating a block diagram of an example wireless communication system for transmitting and receiving downlink and uplink communication signals, according to various arrangements.

FIG. 1 shows an example wireless communication network 100. The wireless communication network 100 corresponds to a group communication within a cellular network. In the wireless communication network 100, a network-side communication node or a base station (BS) can include one or more of a next Generation Node B (gNB), an E-Utran Node B (also known as Evolved Node B, eNodeB or eNB), a pico station, a femto station, a Transmission/Reception Point (TRP), an Access Point (AP), or the like. A terminal-side node or a UE can include a long range communication system (such as but not limited to, a mobile device, a smart phone, a Personal Digital Assistant (PDA), a tablet, a laptop computer) or a short range communication system (such as but not limited to, a wearable device, a vehicle with a vehicular communication system, or the like). As in FIG. 1, a network-side communication node is represented by a BS 102, and a terminal-side communication node is represented by a UE 104a or 104b. In some arrangements, the BS 102 is sometimes referred to as a "wireless communication node," and the UE 104a/104b is sometimes referred to as a "wireless communication device."

As shown in FIG. 1, the BS 102 can provide wireless communication services to the UEs 104a and 104b within a cell 101. The UE 104a can communicate with the BS 102 via a communication channel 103a. Similarly, the UE 104b can communicate with the BS 102 via a communication channel 103b. The communication channels (e.g., 103a and 103b) can be through interfaces such as but not limited to, an Uu interface which is also known as Universal Mobile Telecommunication System (UMTS) air interface. The BS 102 is connected to a Core Network (CN) 108 through an external interface 107, e.g., an Iu interface.

FIG. 2 illustrates a block diagram of an example wireless communication system 150 for transmitting and receiving downlink and uplink communication signals, in accordance with some arrangements of the present disclosure. Referring to FIGS. 1 and 2, the system 150 is a portion of the network 100. In the system 150, data symbols can be transmitted and received in a wireless communication environment such as the wireless communication network 100 of FIG. 1.

The system 150 generally includes the BS 102 and UEs 104a and 104b. The BS 102 includes a BS transceiver module 110, a BS antenna 112, a BS memory module 116, a BS processor module 114, and a network communication module 118. The modules/components are coupled and interconnected with one another as needed via a data communication bus 120. The UE 104a includes a UE transceiver module 130a, a UE antenna 132a, a UE memory module 134a, and a UE processor module 136a. The modules/components are coupled and interconnected with one another as needed via a data communication bus 140a. Similarly, the UE 104b includes a UE transceiver module 130b, a UE antenna 132b, a UE memory module 134b, and a UE processor module 136b. The modules/components are coupled and interconnected with one another as needed via a data communication bus 140b. The BS 102 communicates with the UEs 104a and 104b via communication channels 155, which can be any wireless channel or other medium known in the art suitable for transmission of data as described herein.

The system 150 can further include any number of modules/elements other than the modules/elements shown in FIG. 2. The various illustrative blocks, modules, elements, circuits, and processing logic described in connection with the arrangements disclosed herein can be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionalities. Whether such functionalities are implemented as hardware, firmware, or software depends upon the particular application and design constraints imposed on the overall system. Those familiar with the concepts described herein may implement such functionalities in a suitable manner for each particular application, but such implementation decisions should not be interpreted as limiting the scope of the present disclosure.

A wireless transmission from an antenna of each of the UEs 104a and 104b to an antenna of the BS 102 is known as an uplink transmission, and a wireless transmission from an antenna of the BS 102 to an antenna of each of the UEs 104a and 104b is known as a downlink transmission. In accordance with some arrangements, each of the UE transceiver modules 130a and 130b may be referred to herein as an uplink transceiver, or UE transceiver. The uplink transceiver can include a transmitter circuitry and receiver circuitry that are each coupled to the respective antenna 132a and 132b. A duplex switch may alternatively couple the uplink transmitter or receiver to the uplink antenna in time duplex fashion. Similarly, the BS transceiver module 110 may be herein referred to as a downlink transceiver, or BS transceiver. The downlink transceiver can include RF transmitter circuitry and receiver circuitry that are each coupled to the antenna 112. A downlink duplex switch may alternatively couple the downlink transmitter or receiver to the antenna 112 in time duplex fashion. The operations of the transceivers 110, 130a, and 130b are coordinated in time such that the uplink receiver is coupled to the antenna 132a and 132b for reception of transmissions over the wireless communication channels 155 at the same time that the downlink transmitter is coupled to the antenna 112. In some arrangements, the UEs 104a and 104b can use the UE transceivers 130a and 130b through the respective antennas 132a and 132b to communicate with the BS 102 via the wireless communication channels 155. The wireless communication channel 155 can be any wireless channel or other medium suitable for downlink (DL) and/or uplink (UL) transmission of data as described herein.

The UE transceiver 130a/130b and the BS transceiver 110 are configured to communicate via the wireless data communication channel 155, and cooperate with a suitably configured antenna arrangement that can support a particular wireless communication protocol and modulation scheme.

In some arrangements, the UE transceiver 130a/130b and the BS transceiver 110 are configured to support industry standards such as the Long Term Evolution (LTE) and emerging 5G standards, or the like. It is understood, however, that the present disclosure is not necessarily limited in application to a particular standard and associated protocols. Rather, the UE transceiver 130a/130b and the BS transceiver 110 may be configured to support alternate, or additional, wireless data communication protocols, including future standards or variations thereof.

The processor modules 136a and 136b and 114 may be each implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, methods or algorithms described in connection with the arrangements disclosed herein may be embodied directly in hardware, in firmware, in a software module executed by processor modules 114, 136a, and 136b, respectively, or in any practical combination thereof. The memory modules 116, 134a, 134b can be realized as RAM memory, flash memory, ROM memory, EPROM memory, EEPROM memory, registers, a hard disk, a removable disk, a CD-ROM, or another suitable form of storage medium. In this regard, the memory modules 116, 134a, and 134b may be coupled to the processor modules 114, 136a, and 136b, respectively, such that the processors modules 114, 136a, and 136b can read information from, and write information to, the memory modules 116, 134a, and 134b, respectively. The memory modules 116, 134a, and 134b may also be integrated into their respective processor modules 114, 136a, and 136b. In some arrangements, the memory modules 116, 134a, and 134b may each include a cache memory for storing temporary variables or other intermediate information during execution of instructions to be executed by processor modules 114, 136a, and 136b, respectively. Memory modules 116, 134a, and 134b may also each include non-volatile memory for storing instructions to be executed by the processor modules 114, 136a, and 136b, respectively.

The network interface 118 generally represents the hardware, software, firmware, processing logic, and/or other components of the BS 102 that enable bi-directional communication between BS transceiver 110 and other network components and communication nodes configured to communication with the BS 102. For example, the network interface 118 may be configured to support internet or WiMAX traffic. In a typical deployment, without limitation, the network interface 118 provides an 802.3 Ethernet interface such that BS transceiver 110 can communicate with a conventional Ethernet based computer network. In this manner, the network interface 118 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 118 can allow the BS 102 to communicate with other BSs or core network over a wired or wireless connection.

The BS 102 can communicate with a plurality of UEs (including the UEs 104a and 104b) using multicast or broadcast, collectively referred to as MBS. The plurality of UEs can each receive MBS channel (e.g., MBS PDSCH, MBS PDCCH, and so on) via multicast and/or broadcast. In order to receive the MBS channel, the plurality of UEs have a common understanding on the configurations of the MBS channel, including but not limited to, frequency resource range for resource allocation, scrambling sequence, and so on.

More specifically, R17 MBS restricts the multicast transmission from using the same numerology as the unicast. Therefore, the Common Frequency Domain (CFR) within the dedicated unicast Bandwidth Part (BWP) of a UE is defined for the MBS transmission to allow unicast and multicast to be received simultaneously. In this case, the Physical Downlink Control Channel (PDCCH) and Physical Downlink Shared Channel (PDSCH) for the MBS are configured independently from that of the unicast, while the MBS BWP and the4 unicast BWP share the Sub-Carrier Spacing (SCS)/Cyclic Prefix (CP) parameters. For R18, System Frame Number (SFN)-based MBS transmissions are supported. Therefore, regardless of whether a new SCS is introduced for the MBS transmission or defined as Extended Cyclic Prefix (ECP) (e.g., 15 kHz ECP), the SCS of SFN-based MBS transmission may be less than that of the unicast. For example, the SCS for unicast is 30 kHz while the SCS for MBS is 15 kHz. Then, the configuration of the numerology (including, SCS, CP type, etc) cannot be shared any more. In addition, given that the data transmission in the BWP can be configured with only the same SCS and CP, CFR is no longer applicable for MBS transmissions with SCS/CP that is different with that for the unicast.

Figures 3, 4:
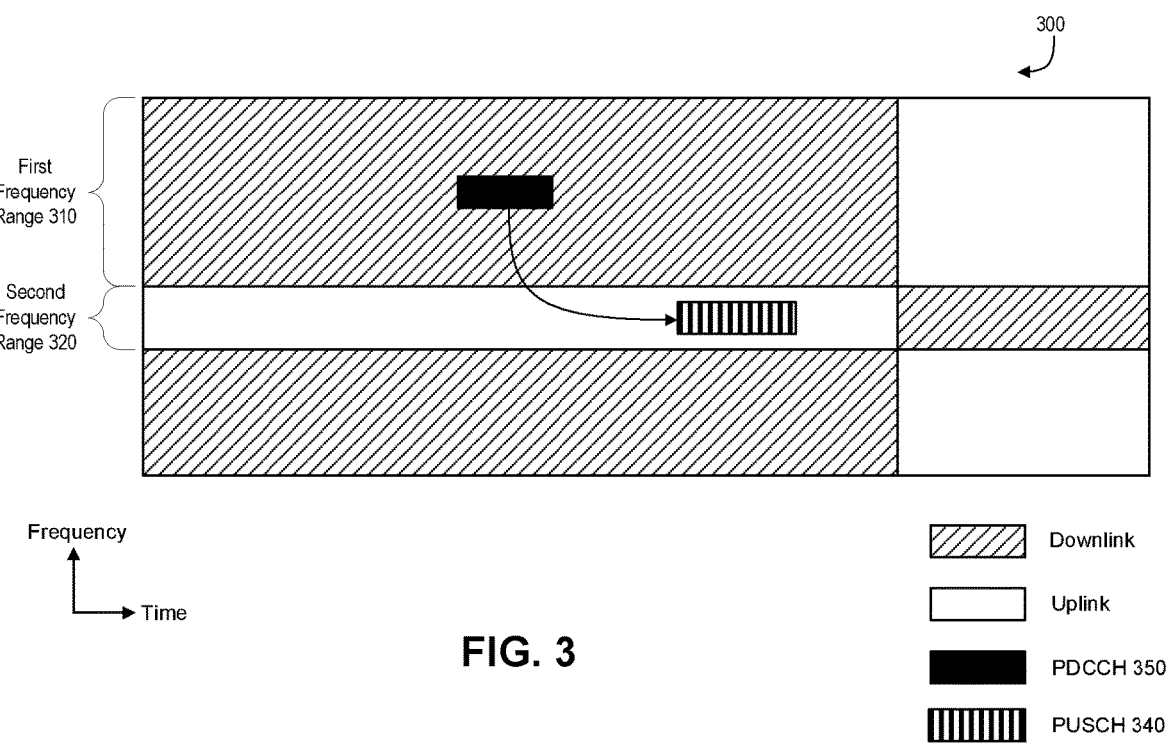
FIG. 3 is a diagram illustrating the manner in which different frequency ranges (e.g., first frequency range and second frequency range) within a carrier are configured with different downlink uplink frame structures, according to various arrangements.
FIG. 4 is a table illustrating an example of mapping between values of a Bandwidth Part (BWP) indicator field and Bandwidth Part (BWP) indices, according to various arrangements.

In another example scenario, flexible duplex or full duplex is proposed to reduce the uplink and downlink conversion delay. In this scenario, UEs receive and transmit signals simultaneously or switch between reception and transmission without delay. FIG. 3 is a diagram illustrating the manner in which different frequency ranges (e.g., first frequency range 310 and second frequency range 320) within a carrier 300 are configured with different downlink uplink frame structures, according to various arrangements. Referring to FIGS. 1-3, the frequency range 310 and the frequency range 320 are configured with a complementary structure. For example, downlink resource in the time domain for the first frequency range 310 corresponds to uplink resource in the time domain for the second frequency range 320, and uplink resource in time domain for the first frequency range 310 corresponds to downlink resource in the time domain for the second frequency range 320. In scheduling an uplink transmission (e.g., a PUSCH 340) using PDCCH 350, the base station can select any uplink slot in either the first frequency range 310 or the second frequency range 320 for the PUSCH 340. This allows the uplink scheduling delay to be saved, and the UE can operate in both frequency ranges simultaneously.

In the multi-bands-single-cell scenario, a cell is defined as a set of frequency resources that span multiple bands/carriers. Transmissions on different bands/carriers within one cell can be performed at the same time. A total number of transmissions that can be received or transmitted simultaneously by a UE is the UE capability of the UE. If the UE can support reception or transmission on multiple bands/carriers, no switching is needed. On the other hand, if the UE can support only one band, dynamically switching among different bands/carriers within a cell is used.

In such scenarios, multiple services need to be transmitted in parallel in the same cell or carrier. The present arrangements relate to coordinating and configuring these concurrent services.

Due to factors such as terminal cost, power consumption, and cell coverage, the base station can configure multiple sets of BWPs for UE on one carrier. For example, at most four sets of BWPs can be configured for a UE per cell. At the same time, the UE in an existing system activates only one set of BWPs and uses this set for data reception and transmission. Each set of BWPs includes at least one of an uplink BWP and a downlink BWP. That is, the BWPs allocated by the base station to the UE can be paired. If the downlink BWP resource of a UE is released or deactivated by the base station, the uplink BWP corresponding to the downlink BWP is also released or deactivated.

In the current Downlink Control Information (DCI) design, a BWP indicator field is included in the DCI format, which is used for scheduling downlink or uplink data for a UE. The BWP indicator field indicates an index that identifies a BWP. The UE and the network (e.g., the base station) can use the indicated BWP for data transmission between the UE and the network. The UE determines the bitwidth (e.g., a number of bits) of this field according to the number of downlink BWPs, e.g., $n_{BEP,RRC}$ (which is configured by higher layers) excluding the initial downlink bandwidth part. That is, the UE receives the parameter $n_{BWP,RRC}$ from the network (e.g., the base station), and determines the bitwidth of the BWP indicator field based on $n_{BWP,RRC}$. In some arrangements, the UE determines the bitwidth for the BWP indicator field based on expression (1):

$$bitwidth = \lceil \log_2 n_{BWP} \rceil; \text{ where} \tag{1}$$

$$n_{BWP} = n_{BWP,RRC} + 1 \text{ if } n_{BWP,RRC} \leq 3; \text{ and} \tag{2}$$

$$n_{BWP} = n_{BWP,RRC} \text{ if } n_{BWP,RRC} > 3. \tag{3}$$

In expression (2), the BWP indicator is equivalent to an ascending order of the higher layer parameter BWP-Id. In some examples, BWP-Id is a higher layer parameter used to indicate an index of a BWP. In expression (3), the BWP indicator is defined in Table 400 in FIG. 4.

In some arrangements in which the BWP indicator field indicates an indicated BWP on which the BWP indicator field is transmitted, the UE does not switch the BWP. In other words, in response to receiving the DCI with BWP indicator field indicating the same BWP on which the DCI is transmitted, the DCI does not trigger any BWP switching for the data scheduled by the DCI. In an example in which the DCI transmitted on BWP identified by BWP-Id=1 (e.g., BWP 1) has a BWP indicator field that indicates 00, the data scheduled by the DCI is also scheduled on BWP identified by BWP-Id=1.

In some arrangements in which the BWP indicator field indicates an indicated BWP other than the indicating BWP on which the BWP indicator field (and associated DCI) is transmitted, BWP switching is triggered for the data scheduled to be communicated on the indicated BWP. In other words, in response to receiving the DCI with BWP indicator field indicating an indicated BWP different from the indicating BWP on which the DCI is transmitted, and the DCI triggers BWP switching for the data scheduled by the DCI, from the indicated BWP to the indicting BWP.

Figure 5:
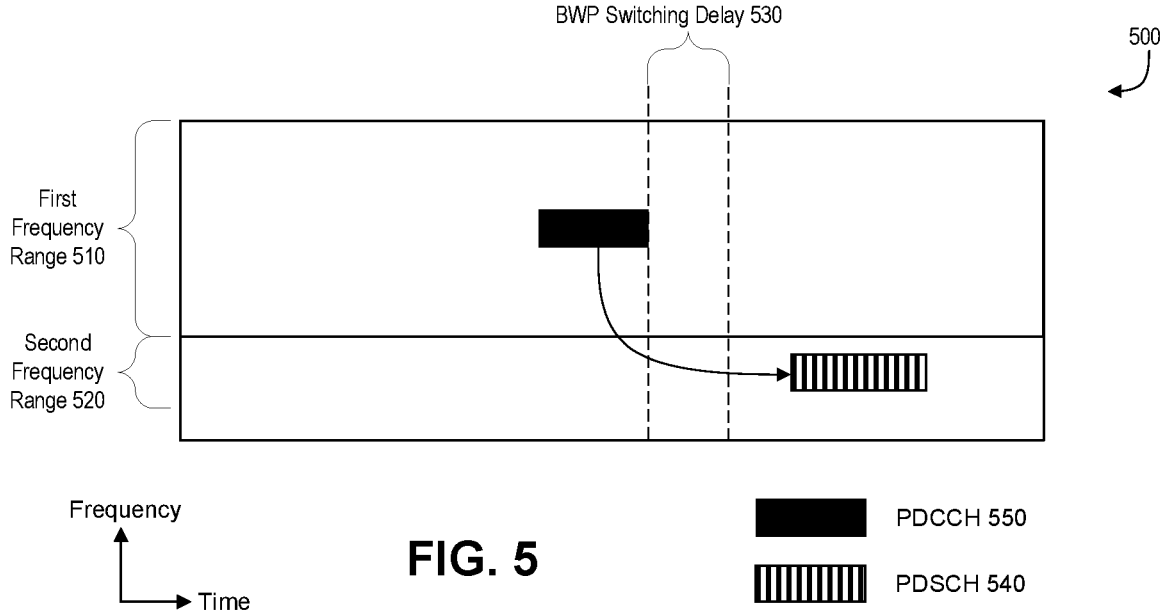
FIG. 5 is a diagram illustrating BWP switching delay, according to various arrangements.

Furthermore, the BWP switching may introduce a switching delay (e.g., 1~3 ms). FIG. 5 is a diagram illustrating BWP switching delay, according to various arrangements. The network (e.g., the base station) sends the PDCCH 550 to the UE on a first frequency range 510 (e.g., first BWP), which is an indicating BWP in the downlink. The PDCCH 550 includes an DCI that schedules the PDSCH 540 and includes a BWP indicator field having a value that indicates the indicated BWP, denoted as the second frequency range 520 (e.g., second BWP). The second frequency range 520 is different from the first frequency range 510. As shown in FIG. 5, during the BWP switching delay 530, the UE cannot transmit or receive data in any BWP, including the frequency range 510 and the second frequency range 520. Therefore, the base station schedules the data (e.g., the PDSCH 540) on the indicated resource (the second frequency range 520) after the BWP switching delay 530, as shown in FIG. 5. In some examples, a DCI transmitted on BWP with BWP-Id=1 (e.g., the first frequency range 510), and the BWP indicator field of the DCI indicates 01. Then, the scheduled data will be transmitted on BWP with BWP-Id=2 (e.g., the second frequency range 520).

In some arrangements in which multiple concurrent transmissions are limited to one activated BWP, service transmission is greatly restricted. If different transmissions are configured in different BWPs, switching between different service transmissions needs to be implemented through BWP switching, which introduces 1~3 ms switching delay. Frequent switching is unacceptable as it impacts user experience. Arrangements disclosed herein relate to activating multiple BWPs simultaneously.

Although BWP is used throughout the present disclosure as a frequency resource of a cell, it should be recognized that the disclosed arrangements can be implemented using any type of frequency resources of a cell including a subband, a Common Frequency Resource (CFR), a frequency band, and so on.

Some arrangements relate to indicating multiple frequency resources that can be activated simultaneously.

In some arrangements, the network (e.g., a base station) configures list of First Type Frequency Resources (FTFRs) for a UE in cell provided by the base station. In other words, the network sends configuration parameters defining each FTFR of the list of FTFRs to the UE. The configuration parameters of each FTFR include at least one of an FTFR index, numerology, frequency position and bandwidth, PDCCH reception configuration (e.g., search space configuration, CORESET configuration, etc.), PDSCH reception configuration (e.g., a TDRA table, etc), Semi-Persistent Scheduling (SPS) configuration, and so on. In some examples, each FTFR is or includes a BWP.

For each configured FTFR, the network (e.g., a base station) can configure one or more frequency resources as a supplementary resource for the configured FTFR. The supplementary resource is referred to herein as a Second Type Frequency Resource (STFR). The configured FTFR and STFR are associated with, mapped on, or grouped with each other. In some examples, the configured FTFR and its associated STFR(s) belong to the same cell. In some examples, the configured FTFR and its associated STFR(s) belong to different frequency bands. In some examples, the configured FTFR and its associated STFR(s) belong to different cells.

In some arrangements, each STFR is or includes a BWP or another suitable frequency resource. The network sends configuration parameters defining each STFR to the UE. The configuration parameters of each STFR include at least one of an STFR index, numerology, frequency position and bandwidth, PDCCH reception configuration, PDSCH reception configuration, SPS configuration, and so on. In some examples, at least some of the configuration parameters can be shared between the FTFR and the STFR associated with the FTFR. For example, FTFR and an associated STFR may have a same numerology (including, SCS, CP type, etc).

Figure 6:
FIG. 6 is a table illustrating an example mapping between FTFRs and STFRs, according to various arrangements.

FIG. 6 is a table 600 illustrating an example mapping between FTFTs and STFRs, according to various arrangements. As shown in table 600, the base station configures for the UE four FTFRs with FTFR indices 1-4. As shown, STFRs with STFR indices 1 and 2 are mapped to FTFR 1. STFR with STFR index 1 is mapped to FTFR index 2. STFR with STFR index 3 is mapped to FTFR index 3. STFR with STFR index 4 is mapped to FTFR index 4.

Figure 7:
FIG. 7 is a table illustrating an example mapping between FTFTs and STFRs, according to various arrangements.

FIG. 7 is a table 700 illustrating an example mapping between FTFTs and STFRs, according to various arrangements. Each FTFR and STFR in table 700 is or includes a BWP. The base station can configure a total of 8 BWPs with BWP indices 1-8. Each FTFR or STFR is identified by a BWP index. As shown in table 700, the base station configures for the UE four FTFRs with FTFR BWP indices 1-4. As shown, STFR with BWP index 5 is mapped to FTFR with BWP index 1. STFR with BWP index 6 is mapped to FTFR with BWP index 2. STFR with BWP index 7 is mapped to FTFR with BWP index 3. STFR with BWP index 8 is mapped to FTFR with BWP index 4. Accordingly, for this given cell BWP indices 5-8 are STFRs mapped to FTFRs with BWP indices 1-4, respectively.

In some examples, a STFR can be mapped to two or more FTFRs.

In some examples, the UE can activate an STFR only in response to determining that at least one of its associated or mapped FTFR is activated. In response to determining that all of FTFR(s) associated with or mapped to the STFR are deactivated, the UE deactivates the STFR.

In some examples, the uplink or downlink transmission on a STFR can only be scheduled or indicated by control information (e.g., DCI) transmitted on its associated FTFR. That is, the base station can transmit control information to the UE on an FTFR to schedule transmission on a STFR mapped to the FTFR. There is no switching delay between reception of the control information on the FTFR and reception of the transmission on the STFR as scheduled by the control information. In other words, in some arrangements, communicating using the first FTFR and the at least one STFR mapped to the first FTFR includes sending by the BS 102 to the UE 104a and receiving by the UE 104a from the BS 102 the control information on the first FTFR. The control information schedules a data transmission on one of the at least one STFR mapped to the FTFR. In some examples, the BS 102 sends to the UE 104a and the UE 104a receives from the BS 102 the data transmission on the one of the at least one STFR. In some examples, the UE 104a sends to the BS 102 and the BS 102 receives from the UE 104a the data transmission on the one of the at least one STFR.

In some examples, the uplink or downlink transmission on a STFR can be scheduled or indicated by control information (e.g., DCI) transmitted on the STFR or its associated FTFR or other STFR associated the same FTFR. That is, the base station can transmit control information to the UE on an FTFR or a STFR or another STFR to schedule transmission on the STFR that is mapped to the FTFR. There is no switching delay between reception of control information on the FTFR or the STFR and reception of the transmission on the STFR as scheduled by the control information. Thus, in some arrangements, communicating using the first FTFR and the at least one STFR mapped to the first FTFR includes sending by the BS 102 to the UE 104a and receiving by the UE 104a from the BS 102 the control information on FTFR or one of the at least one STFR. The control information schedules a data transmission on the one of the at least one STFR or other STFR associated with the same FTFR. In some examples, the BS 102 sends to the UE 104a and the UE 104a receives from the BS 102 the data transmission on the one of the at least one STFR. In some examples, the UE 104a sends to the BS 102 and the BS 102 receives from the UE 104a the data transmission on the one of the at least one STFR or other STFR associated with the same FTFR.

In some examples, the uplink or downlink transmission on a STFR can be scheduled or indicated by control information (e.g., DCI) transmitted on a FTFR, which is not associated with the STFR. That is, the base station can transmit control information to the UE on an FTFR to schedule transmission on the STFR that is mapped to another FTFR. There is a switching delay between reception of the control information on the FTFR and the reception of the transmission on the STFR scheduled by the control information. Therefore, in some arrangements, communicating using the first FTFR and the at least one STFR mapped to the first FTFR includes sending by the BS 102 to the UE 104a and receiving by the UE 104a from the BS 102 the control information control information on a second FTFR. The control information schedules a data transmission on one of the at least one STFR. In some examples, the BS 102 sends to the UE 104a and the UE 104a receives from the BS 102 the data transmission on the one of the at least one STFR. In some examples, the UE 104a sends to the BS 102 and the BS 102 receives from the UE 104a the data transmission on the one of the at least one STFR.

In some examples, the uplink or downlink transmission on a FTFR can be scheduled or indicated by control information (e.g., DCI) transmitted on that FTFR or other FTFR. That is, the base station can transmit control information to the UE on an FTFR to schedule transmission on that FTFR or another FTFR. If the control information and the transmission scheduled by the control information are located on different FTFRs, there is a switching delay between reception of control information on the FTFR and reception of the transmission on another FTFR as scheduled by the control information. Thus, in some arrangements, communicating using the first FTFR and the at least one STFR mapped to the first FTFR includes sending by the BS 102 to the UE 104a and receiving by the UE 104a from the BS 102 the control information on a second FTFR. The control information schedules a data transmission on the first FTFR. In some examples, the BS 102 sends to the UE 104a and the UE 104a receives from the BS 102 the data transmission on the one of the first FTFR. In some examples, the UE 104a sends to the BS 102 and the BS 102 receives from the UE 104a the data transmission on the first FTFR.

Some arrangements relate to determining on which resource (e.g., FTFR or STFR) the transmission scheduled or indicated by a DCI is to be transmitted or received by the UE.

In some examples, a resource indicator field is defined in a DCI format of the control information, which is used for scheduling downlink or uplink data (e.g., PDSCH or PUSCH). The resource indicator field indicates on which resource the scheduled or indicated transmission is to be transmitted. More specifically, this field used for indicating which one of FTFR and STFR is the indicated frequency resource, which is to be used for transmitting or receiving the transmission scheduled or indicated by this DCI.

In some examples in which at most one STFR can be associated with a FTFR, the resource indicator field has a bitwidth of 1 bit. A first value (e.g., "1") of this bit represents FTFR, and a second value (e.g., "0") of this bit represents STFR.

Figures 8, 9:
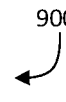
FIG. 8 is a table illustrating an example mapping between values of a resource indicator field and frequency resources FTFTs and STFRs, according to various arrangements.
FIG. 9 is a table illustrating an example mapping between values of a BWP indicator field and BWPs, according to various arrangements.

In some examples in which there are two or more STFRs (e.g., N STFRs) associated with or mapped to a FTFR. N represents the number of STFRs currently configured for or mapped to the FTFR in some arrangements. In other arrangements, N represents the maximum number of STFRs that can be associated with or mapped to a FTFR. To indicate resource from the N STFRs and the FTFR, the base station sends the control information to the UE where the resource indicator field has a bitwidth of $$\log_2^{(N+1)}$$

bits. The frequency resources, including FTFR and STFRs associated with the FTFR, are numbered (indexed) and mapped with the values of the resource indicator field. FIG. 8 is a table 800 illustrating an example mapping between values of a resource indicator field (e.g., a first field) and frequency resources FTFTs and STFRs, according to various arrangements. Referring to the table 800, three STFRs, STFR indices (STFR-Ids) 1-3 are associated with or mapped to a FTFR. Other examples of mapping between values of a resource indicator field and frequency resources FTFTs and STFRs can be suitably implemented.

In some arrangements, the combination of resource indicator field and the BWP indicator field can be used for indicating a transmission on another FTFR or a STFR associated with another FTFR. FIG. 9 is a table 900 illustrating an example mapping between values of a BWP indicator field (e.g., a second field) and BWPs, according to various arrangements. Referring to table 900, two FTFRs are defined or identified as BWPs with BWP indices 1 and 2, respectively. There are three STFRs associated with or mapped to BWP index 1 with STFR indices 1, 2, and 3. There are three STFRs associated with or mapped to BWP index 2 with STFR indices 1, 2, 3. For example, an example mapping relationship between the values of BWP indicator field of the control information and FTFR is that the value of "0" corresponds to the FTFR with BWP index 1 and the value of "1" corresponds to the FTFR with BWP index 2. An example mapping relationship between values of the resource indicator field and resource (including FTFRs and their associated STFRs) can follow, for example, the table 800.

The BWP indicator field of the control information indicates at least one selected FTFR, and the resource indicator field of the control information further indicates a frequency resource from the FTFR indicated by BWP indicator field and STFRs associated with or mapped to the FTFR.

More specifically, the base station can transmit a DCI on a FTFR (e.g., BWP 1) to the UE. The BWP indicator field of the DCI has a value of "1" which is a value that indicates BWP 2 as shown in the table 900. Then, the frequency resource can be further indicated from BWP 2 and its associated STFRs. The resource indicator field indicates "01," which corresponds to the STFR with STFR-Id=1 as shown in table 800. The STFR with STFR-Id=1 is used for the transmission scheduled or indicated by the DCI.

In some examples, BWP indicator field can be used to indicate the FTFR and the STFR(s) mapped thereto. In such examples, the BWP indicator field has a bitwidth of M bits. M represents the number of BWP configured by the base station for a UE in some arrangements. In other arrangements, M represents the maximum number of BWPs can be configured for a UE per cell.

Figure 10:
FIG. 10 is a table illustrating an example mapping between values of a BWP indicator field and BWPs, according to various arrangements.

FIG. 10 is a table 1000 illustrating an example mapping between values of a BWP indicator field (e.g., in this case, the first field) and BWPs, according to various arrangements. Referring to table 1000, a FTFR with BWP index 1 and STFRs with BWP indices 2, 3, and 4 mapped to the FTFR are configured for the UE. The mapping between bit values and resources can be defined in ascending order according to BWP index. As shown, the lowest BWP index corresponds to the FTFR and the BWP indices greater than the lowest BWP index correspond to STFRs.

Alternatively, the mapping between bit values and resources can be defined in descending order according to BWP index, such that the highest BWP index corresponds to the FTFR and the BWP indices less than the highest BWP index correspond to STFRs.

Figure 11:
FIG. 11 is a table illustrating an example mapping between values of a BWP indicator field and BWPs, according to various arrangements.

In some examples, there are two or more FTFRs. For example, BWP index 1 is configured as a first FTFR, and BWP indices 2, 3, 4 are configured as STFRs associated with or mapped to the first FTFR. In addition, the base station configures another BWP, e.g., BWP index 5 as a second FTFR for the UE. The base station further configures BWP indices 6, 7, 8 are configured as STFRs associated with or mapped to the second FTFR. FIG. 11 is a table 1100 illustrating an example mapping between values of a BWP indicator field (e.g., in this case, the first field) and BWPs, according to various arrangements. Referring to table 1100, a first FTFR with BWP index 1 and STFRs with BWP indices 2, 3, and 4 mapped to the first FTFR are configured for the UE. Further, a second FTFR with BWP index 5 and STFRs with BWP indices 6, 7, and 8 mapped to the second FTFR are configured for the UE. The base station transmits a DCI containing the BWP indicator field to the UE on BWP index 1. The value of BWP indicator field is 111, meaning that the scheduled or indicated transmission is to be transmitted on BWP index 8 (i.e., a STFR associated with the second FTFR, i.e., BWP index 5).

Accordingly, the resource selection mechanism as described herein allow a proper resource to be selected according to the indication in the DCI, and the resource is used to transmit or receive scheduled data.

Some arrangements relate to determining or identifying the frequency resource (e.g., FTFR or STFR) on which the transmission scheduled or indicated by a DCI is to be transmitted.

The principles or rules of selecting transmission resources can be predefined or configured via signaling, e.g., RRC signaling, MAC layer signaling, DCI, or so on. In one example, resources on the FTFR is typically preferred over resources of an STFR. If there is no resource on the FTFR (e.g., if no FTFR is available), one or more resources on an STFR are selected.

In some examples in which there are two or more STFRs associated with an FTFR, the STFRs are sorted in accordance with certain rules, where the order of the sorted STFRs correspond to preference in selecting the STFRs. For example, the rule may relate to frequency locations of the STFRs, the indices of the STFRs, and so on. Alternatively, the order in selecting the STFRs (e.g., the order) can be configured via signaling, e.g., RRC signaling, MAC layer signaling, or so on.

In some examples, the transmissions include at least one of dynamically scheduling uplink data carried on PUSCH, dynamically scheduling downlink data carried on PDSCH, Uplink Control Information (UCI), DCI, configured grant uplink data carried on PUSCH, SPS downlink data carried on PDSCH, Channel Status Information— Reference Signal (CSI-RS), Synchronization Signal Block (SSB), Sounding Reference Signal (SRS), and so on.

The types of transmissions applicable to the above principles can be defined through protocols or configured through signaling, e.g., RRC signaling, MAC layer signaling, or Physical Layer signaling (e.g., DCI).

Figure 12:
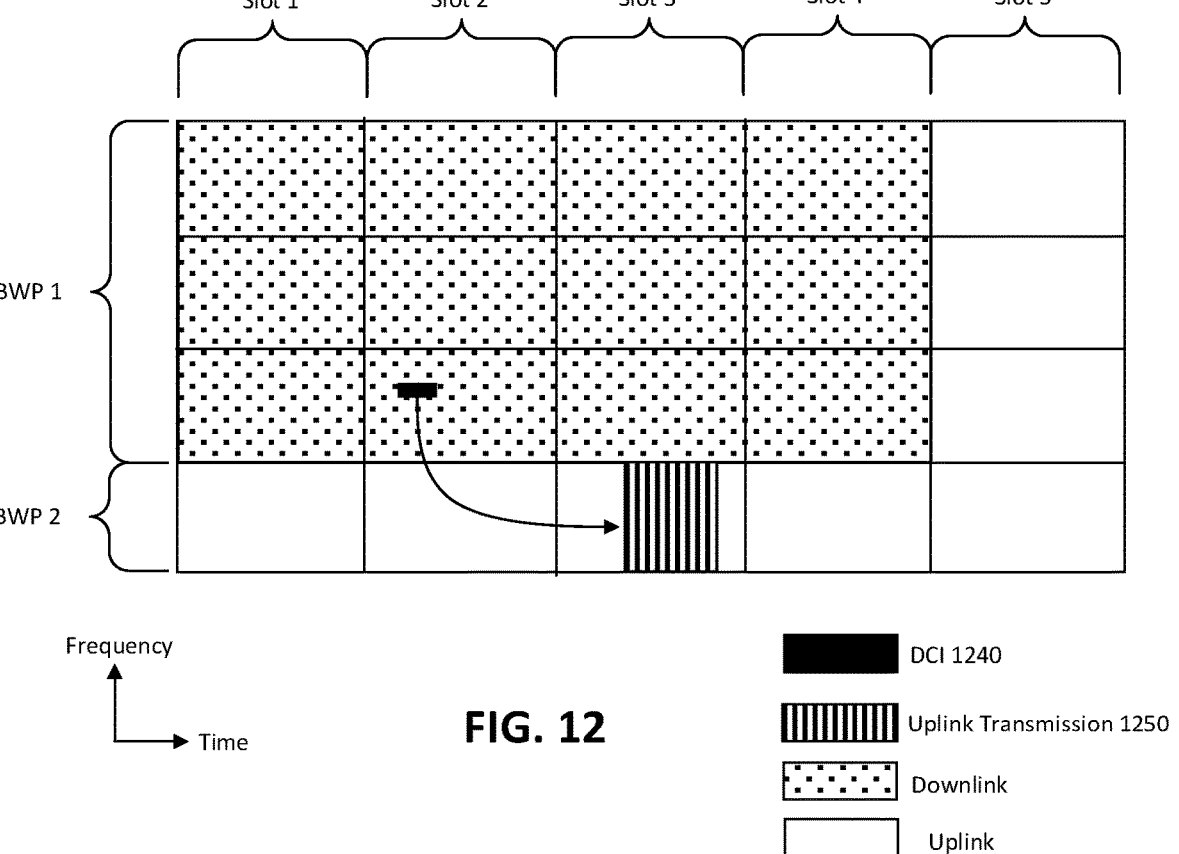
FIG. 12 is a diagram illustrating example method for scheduling transmission using FTFR and STFR, according to various arrangements.

FIG. 12 is a diagram illustrating example method for scheduling transmission using FTFR and STFR, according to various arrangements. Referring to FIG. 12, the TDD frame structure for each of BWP 1 and BWP 2 are configured as shown in FIG. 12. For example, BWP index 1 in slots 1, 2, 3, and 4 are for downlink, while in slot 5 is for uplink. BWP index 2 in slots 1, 2, 3, 4, and 5 are for uplink. The base station configures BWP index 1 as the FTFR and BWP index 2 as the STFR associated with the FTFR. The base station transmits in slot 2 a DCI 1240 on BWP index 1 (the FTFR) which schedules an uplink transmission 1250 in the next slot 3 for the UE. In response to determining that there is no uplink resource in the indicated slot (e.g., slot 3) on FTFR, the UE transmits the uplink transmission on the STFR, the BWP index 2.

Figures 13, 14:
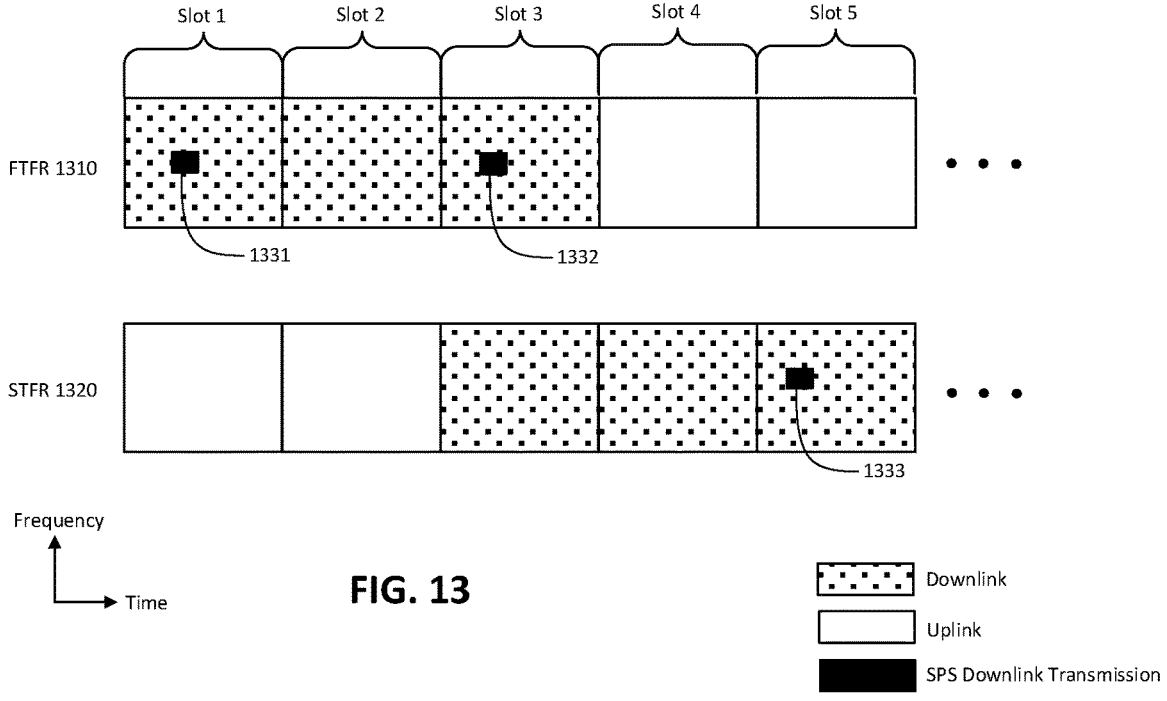
FIG. 13 is a diagram illustrating example method for scheduling transmission using FTFR and STFR, according to various arrangements.
FIG. 14 is a table illustrating an example mapping between values of a BWP indicator field and BWPs, according to various arrangements.

FIG. 13 is a diagram illustrating example method for scheduling transmission using FTFR and STFR, according to various arrangements. Referring to FIG. 13, the base station configures FTFR 1310 and STFR 1320 for a cell for a UE according to any method described herein. The TDD frame structure for each of FTFR 1310 and STFR 1320 are configured as shown in FIG. 13. For example, FTFR 1310 in slots 1, 2, and 3 are for downlink, while in slots 4 and 5 are for uplink. STFR 1320 in slots 1 and 2 are for uplink, while in slots 3, 4, and 5 are for downlink.

A SPS downlink transmission is configured to be transmitted on this cell to the UE. The base station sends the first occasion 1331 in slot 1 and second occasion 1332 in slot 3 for the SPS downlink transmission on downlink resources on the FTFR 1310. For the third occasion 1333 for the SPS downlink transmission which is schedule for slot 5, there is no downlink resource on FTFR. Therefore, the base station transmits the third occasion 1333 for the SPS downlink transmission on the STFR 1320.

In some examples, in response to determining that are no available resources on either FTFR or STFR for any additional occasions, the transmission on such additional occasions is paused, and the transmission can be resumed on the next occasion on any available resource on either the FTFR or the STFR.

Accordingly, a proper resource can be selected according to suitable principles or rules, and available resource on the FTFR or STFR can be used to transmit or receive scheduled data.

Some arrangements relate to mechanisms for determining a resource (e.g., FTFR or STFR) on which a transmission scheduled or indicated by a DCI is to be transmitted.

In some examples, BWP indicator field or resource indicator field in a DCI indicates a FTFR. A resource from the indicated FTFR and its associated one or more STFRs are determined for the transmission scheduled or indicated by the DCI according to suitable principle or rules.

The principles or rules of selecting transmission resources can be predefined or configured via signaling, e.g., RRC signaling, MAC layer signaling, DCI, or so on. In one example, resources on the FTFR is typically preferred over resources of an STFR. If there is no resource on the FTFR (e.g., if no FTFR is available), one or more resources on an STFR are selected.

In some examples in which there are two or more STFRs associated with an FTFR, the STFRs are sorted in accordance with certain rules, where the order of the sorted STFRs correspond to preference in selecting the STFRs. For example, the rule may relate to frequency locations of the STFRs, the indices of the STFRs, and so on. Alternatively, the preference in selecting the STFRs (e.g., the order) can be configured via signaling, e.g., RRC signaling, MAC layer signaling, or so on.

In some examples, the transmissions include at least one of dynamically scheduling uplink data carried on PUSCH, dynamically scheduling downlink data carried on PDSCH, UCI, DCI, configured grant uplink data carried on PUSCH, SPS downlink data carried on PDSCH, CSI-RS, SSB, SRS, and so on.

The types of transmissions applicable to the above principles can be defined through protocols or configured through signaling, e.g., RRC signaling, MAC layer signaling, or Physical Layer signaling (e.g., DCI).

FIG. 14 is a table 1400 illustrating an example mapping between values of a BWP indicator field and BWPs (or FTFRs), according to various arrangements. Referring to table 1400, the base station configures four FTFRs for a UE for a cell, with FTFR indices 1-4 or BWP indices 1-4. The BWP indicator field or resource indicator field in control information (e.g., a DCI) transmitted by the base station to the UE on FTFR index 1 (BWP index 1) indicates "01," which corresponds to FTFR index 2 (BWP index 2). There may one or more STFRs associated with FTFR index 2 (BWP index 2). The UE determines on which resource the transmission scheduled or indicated by the DCI is transmitted or received. The resource is selected from FTFR index 2 and its associated STFR(s) according to predefined rules.

Thus, available resource on the FTFR or STFR can be used to transmit or receive scheduled data. In some arrangements, receiving the first indication by the UE 104a or sending the first indication by the BS 102 includes receiving/sending an indication that identifies a FTFR. The method 1600 further includes determining, by the UE 104a according to a rule, one of the FTFR and at least one STFR mapped to the FTFR for sending data transmission to the BS 102 or receiving data transmission from the BS 102.

Some arrangements relate to mechanisms for operating with multiple frequency resources within one cell.

In some examples in which two or more uplink transmissions are scheduled or indicated or configured in different frequency resources, and these frequency resources conflict or collide with one another in time domain, the uplink transmissions are multiplexed into a transmission and sent on a specific resource by the UE to the base station. The collision in time domain includes overlapping with each other in the time domain, or within a same time interval (e.g., slot, subframe, sub-slot, etc.).

Figure 15:
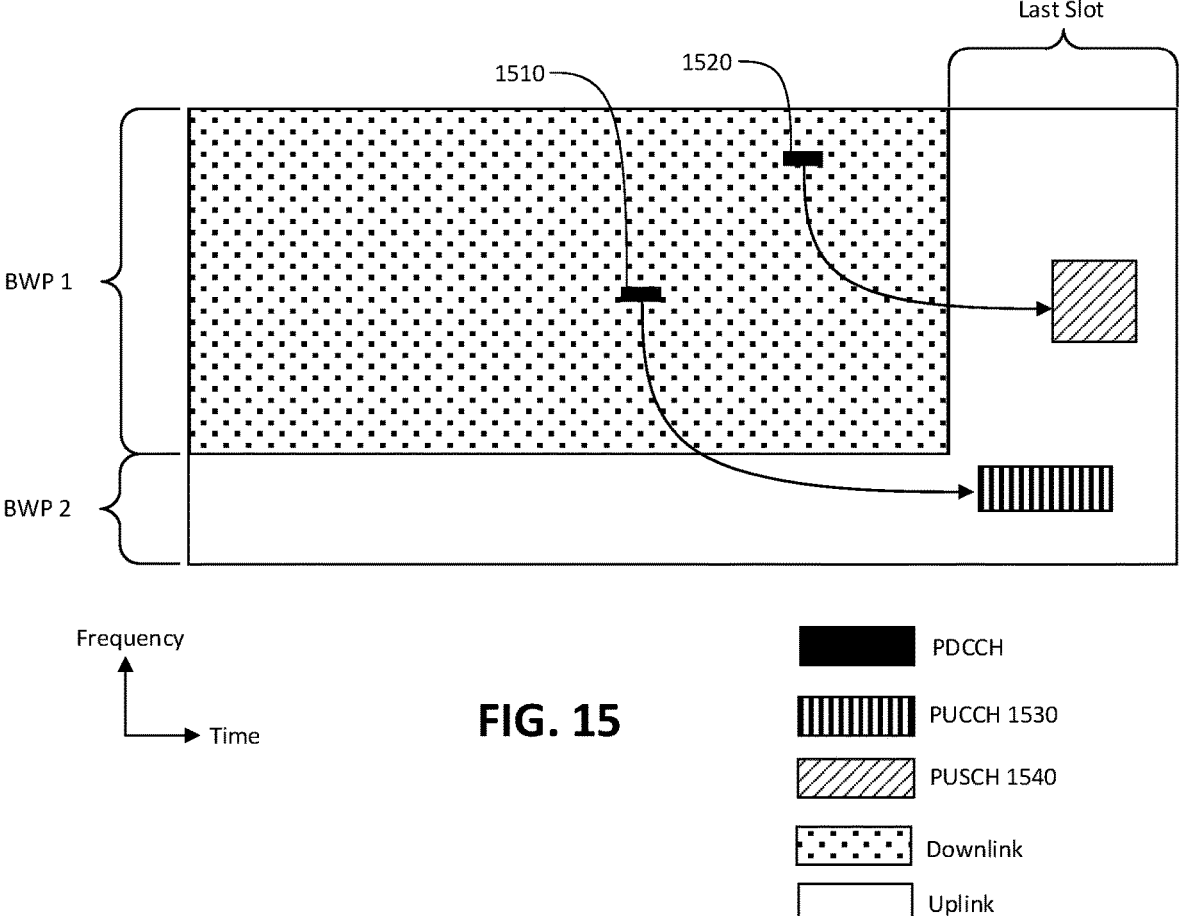
FIG. 15 is a diagram illustrating an example method for scheduling uplink transmissions, according to various arrangements.

FIG. 15 is a diagram illustrating an example method for scheduling uplink transmissions, according to various arrangements. As shown in FIG. 15, two resources with BWP index 1 and BWP index 2 are activated for a UE. A PUSCH is scheduled by the PDCCH 1510 on BWP 1. The resource (e.g., PUCCH 1530) for feedback is indicated in the last slot on BWP 2. Then, the UE is further scheduled with an uplink transmission (carried on PUSCH 1540), which is also in the last slot on BWP 1. The PUCCH 1530 and the PUSCH 1540 overlap in the time domain as shown. In response to determining the overlap, the feedback information on PUCCH 1530 and uplink transmission on PUSCH 1540 are multiplexed with each other. For example, the feedback information will be piggybacked or appended on PUSCH 1540 for the uplink transmission. The PUCCH 1530 will no longer be transmitted by the UE.

In some examples, the transmission resources of two or more UCIs (including at least one of, HARQ-ACK, CSI, SR, etc) are indicated to different frequency resource, but in a same slot or overlapping with each other in the time domain. In response to determining the overlap, the UE multiplexes the UCIs into one UCI. In addition, a resource satisfying the requirement of UCI size after multiplexing will be selected for sending the UCI after multiplexing.

Therefore, in some arrangements, communicating using the first FTFR and the at least one STFR mapped to the first FTFR includes determining, by the UE 104a, that a first resource on the first FTFR and a second resource on one of the STFR overlap in a time domain, determining, by the UE 104a, multiplexed data by multiplexing uplink data scheduled on the first resource and uplink data scheduled on the second resource, and sending, by the UE 104a to the BS 102, the multiplex data on the first FTFR or one of the at least one STFR. Accordingly, transmission multiplexing methods allow two or more uplink transmissions indicated or scheduled on different frequency resources with time domain resource collision to be multiplexed with each other. An applicable resource can be selected for transmitting the final multiplexed data.

Various arrangements relate to coordinating and configuring concurrent services. In particular, different types of resources are defined for data transmission. A resource indicator field or a BWP indicator field is defined for indicating the transmission resource among different types of resources. Further, rules can be defined for selecting resource from different types of resource. Transmission collision among more than on uplink transmissions is further addressed. Arrangements disclosed herein improve the efficiency of concurrent transmission of multiple services.

Figure 16:
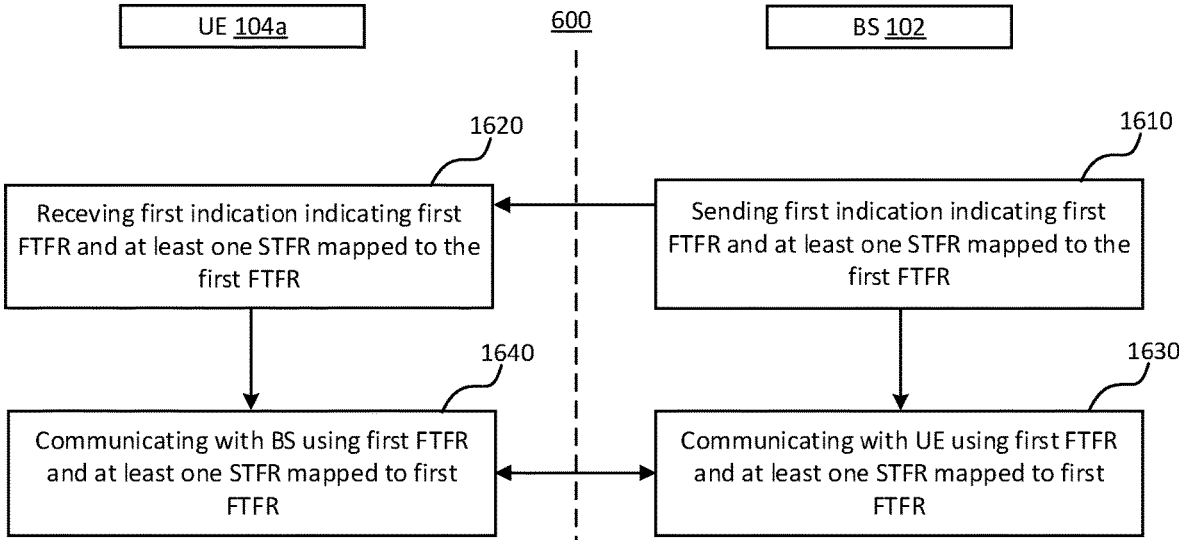
FIG. 16 is a flowchart diagram illustrating an example method for managing service transmissions using multiple frequency resources, according to various arrangements.

FIG. 16 is a flowchart diagram illustrating an example method 1600 for managing service transmissions using multiple frequency resources, according to various arrangements. Referring to FIGS. 1-16, the method 1600 can be performed by the UE 104a and the network (e.g., the BS 102).

At 1610, the network (e.g., the BS 102) sends to the UE 104a first indication indicating a first FTFR and at least one STFR mapped to the first FTFR. At 1620, the UE 104a receives the first indication from the BS 102.

In some arrangements, the first indication corresponds to values of a first field in control information received by the UE 104a from the BS 102. The first field is the resource indicator field in the arrangements in which the BWP indicator filed is used to identify the FTFR, and the resource indicator field (the second field) is used to identify mapping or the mapped STFR(s), for example, as described with reference to tables 800 and 900. In such arrangements, the BS 102 sends to the UE 104 and the UE receives from the BS 102, second indication identifying the FTFR, the second indication corresponding to values of a second field in the control information received by the UE 104a from the BS 102. In other arrangements, the first field corresponds to the BWP indicator field, for example, as described with reference to tables 1000 and 1100.

In some arrangements, the first indication includes control information (e.g., DCI) as described herein. At 1630 and 1640, the network (e.g., the BS 102) and the UE 104a communicate with one another using the first FTFR and at least one STFR mapped to the FTFR.

In some arrangements, communicating using the first FTFR and the at least one STFR mapped to the first FTFR includes sending by the BS 102 to the UE 104a and receiving by the UE 104a from the BS 102 the control information on the first FTFR. The control information schedules a data transmission on one of the at least one STFR. In some examples, the BS 102 sends to the UE 104a and the UE 104a receives from the BS 102 the data transmission on the one of the at least one STFR. In some examples, the UE 104a sends to the BS 102 and the BS 102 receives from the UE 104a the data transmission on the one of the at least one STFR.

In some arrangements, communicating using the first FTFR and the at least one STFR mapped to the first FTFR includes sending by the BS 102 to the UE 104a and receiving by the UE 104a from the BS 102 the control information on one of the at least one STFR. The control information schedules a data transmission on the one of the at least one STFR. In some examples, the BS 102 sends to the UE 104a and the UE 104a receives from the BS 102 the data transmission on the one of the at least one STFR. In some examples, the UE 104a sends to the BS 102 and the BS 102 receives from the UE 104a the data transmission on the one of the at least one STFR.

In some arrangements, communicating using the first FTFR and the at least one STFR mapped to the first FTFR includes sending by the BS 102 to the UE 104a and receiving by the UE 104a from the BS 102 the control information on a second FTFR. The control information schedules a data transmission on one of the at least one STFR. In some examples, the BS 102 sends to the UE 104a and the UE 104a receives from the BS 102 the data transmission on the one of the at least one STFR. In some examples, the UE 104a sends to the BS 102 and the BS 102 receives from the UE 104a the data transmission on the one of the at least one STFR.

In some arrangements, communicating using the first FTFR and the at least one STFR mapped to the first FTFR includes sending by the BS 102 to the UE 104a and receiving by the UE 104a from the BS 102 the control information on a second FTFR. The control information schedules a data transmission on the first FTFR. In some examples, the BS 102 sends to the UE 104a and the UE 104a receives from the BS 102 the data transmission on the one of the first FTFR. In some examples, the UE 104a sends to the BS 102 and the BS 102 receives from the UE 104a the data transmission on the first FTFR.

In some arrangements, communicating using the first FTFR and the at least one STFR mapped to the first FTFR includes determining, by the UE 104a, whether the first FTFR includes an uplink resource for an uplink transmission scheduled using the first FTFR or a downlink resource for a downlink transmission scheduled using the first FTFR. In response to determining that the first FTFR does not include the uplink resource for the uplink transmission scheduled using the first FTFR or the downlink resource for the downlink transmission scheduled using the first FTFR, a respective one of sending the uplink transmission to the BS 102 using an uplink resource of the STFR or receiving the downlink transmission from the BS 102 using a downlink resource of the STFR.

In some arrangements, receiving the first indication by the UE 104a or sending the first indication by the BS 102 includes receiving/sending an indication that identifies a FTFR. The method 1600 further includes determining, by the UE 104*a* according to a rule, one of the FTFR and at least one STFR mapped to the FTFR for sending data transmission to the BS 102 or receiving data transmission from the BS 102.

In some arrangements, communicating using the first FTFR and the at least one STFR mapped to the first FTFR includes determining, by the UE 104*a*, that a first resource on the first FTFR and a second resource on one of the STFR overlap in a time domain, determining, by the UE 104*a*, multiplexed data by multiplexing uplink data scheduled on the first resource and uplink data scheduled on the second resource, and sending, by the UE 104*a* to the BS 102, the multiplex data on the first FTFR or one of the at least one STFR.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It is understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is further understood by those within the art that if a specific number of an introduced claim recitation is intended, such an intent is explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to the disclosure containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It is further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" is understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the disclosure be defined by the claims appended hereto and their equivalents.

What is claimed is:

1. A wireless communication method, comprising:

receiving, by a wireless communication device from a network, first indication indicating a first First Type Frequency Resource (FTFR) and at least one Second Type Frequency Resource (STFR) mapped to the first FTFR, wherein the first indication corresponds to values of a first field in control information received by the wireless communication device from the network; and communicating, by the wireless communication device with the network, using the first FTFR and the at least one STFR mapped to the first FTFR, wherein the communicating comprises:

determining, by the wireless communication device, whether the first FTFR comprises an uplink resource for an uplink transmission scheduled using the first FTFR or a downlink resource for a downlink transmission scheduled using the first FTFR; and in response to determining that the first FTFR does not comprise the uplink resource for the uplink transmission scheduled using the first FTFR or the downlink resource for the downlink transmission scheduled using the first FTFR, a respective one of:

sending the uplink transmission to the network using an uplink resource of the STFR; or receiving the downlink transmission from the network using a downlink resource of the STFR.

2. The wireless communication method of claim 1, wherein communicating using the first FTFR and the at least one STFR mapped to the first FTFR comprises:

receiving, by the wireless communication device from the network, control information on the first FTFR, wherein the control information schedules a data transmission on one of the at least one STFR; and one of:

receiving, by the wireless communication device from the network, the data transmission on the one of the at least one STFR; or sending, by the wireless communication device to the network, the data transmission on the one of the at least one STFR.

3. The wireless communication method of claim 1, wherein communicating using the first FTFR and the at least one STFR mapped to the first FTFR comprises:

receiving, by the wireless communication device from the network, control information on one of the at least one STFR, wherein the control information schedules a data transmission on the one of the at least one STFR; and one of:

receiving, by the wireless communication device from the network, the data transmission on the one of the at least one STFR; or sending, by the wireless communication device to the network, the data transmission on the one of the at least one STFR.

4. The wireless communication method of claim 1, wherein communicating using the first FTFR and the at least one STFR mapped to the first FTFR comprises:

receiving, by the wireless communication device from the network, control information on a second FTFR, wherein the control information schedules a data transmission on one of the at least one STFR; and one of:

receiving, by the wireless communication device from the network, the data transmission on the one of the at least one STFR; or sending, by the wireless communication device to the network, the data transmission on the one of the at least one STFR.

5. The wireless communication method of claim 1, wherein communicating using the first FTFR and the at least one STFR mapped to the first FTFR comprises:

receiving, by the wireless communication device from the network, control information on a second FTFR, wherein the control information schedules a data transmission on the first FTFR; and one of:

receiving, by the wireless communication device from the network, the data transmission on the one of the first FTFR; or sending, by the wireless communication device to the network, the data transmission on the one of the first FTFR.

6. The wireless communication method of claim 1, further comprising receiving, by the wireless communication device from the network, second indication identifying the FTFR, wherein the second indication corresponds to values of a second field in the control information received by the wireless communication device from the network.

7. The wireless communication method of claim 1, wherein receiving the first indication comprises receiving an indication that identifies a FTFR; and the method further comprises determining according to a rule, by the wireless communication device, one of the FTFR and at least one STFR mapped to the FTFR for sending data transmission to the network or receiving data transmission from the network.

8. The wireless communication method of claim 1, wherein communicating using the first FTFR and the at least one STFR comprises:

determining, by the wireless communication device, that a first resource on the first FTFR and a second resource on one of the STFR overlap in a time domain;

determining, by the wireless communication device, multiplexed data by multiplexing uplink data scheduled on the first resource and uplink data scheduled on the second resource; and sending, by the wireless communication device to the network, the multiplex data on the first FTFR or one of the at least one STFR.

9. A wireless communication device, comprising:

at least one processor configured to:

receive, via a transceiver from a network, first indication indicating a first First Type Frequency Resource (FTFR) and at least one Second Type Frequency Resource (STFR) mapped to the first FTFR, wherein the first indication corresponds to values of a first field in control information received by the wireless communication device from the network; and communicate, via the transceiver with the network, using the first FTFR and the at least one STFR mapped to the first FTFR, which comprises:

determining whether the first FTFR comprises an uplink resource for an uplink transmission scheduled using the first FTFR or a downlink resource for a downlink transmission scheduled using the first FTFR; and in response to determining that the first FTFR does not comprise the uplink resource for the uplink transmission scheduled using the first FTFR or the downlink resource for the downlink transmission scheduled using the first FTFR, a respective one of:

sending, via the transceiver, the uplink transmission to the network using an uplink resource of the STFR; or receiving, via the transceiver, the downlink transmission from the network using a downlink resource of the STFR.

10. A network node, comprising:

at least one processor configured to:

send, via a transceiver to a wireless communication device, first indication indicating a first First Type Frequency Resource (FTFR) and at least one Second Type Frequency Resource (STFR) mapped to the first FTFR, wherein the first indication corresponds to values of a first field in control information received by the wireless communication device from the network; and communicate, via the transceiver with the wireless communication device, using the first FTFR and the at least one STFR mapped to the first FTFR, wherein:

the wireless communication device determines whether the first FTFR comprises an uplink resource for an uplink transmission scheduled using the first FTFR or a downlink resource for a downlink transmission scheduled using the FTFR; and in response to the wireless communication device determining that the first FTFR does not comprise the uplink resource for the uplink transmission scheduled using the first FTFR or the downlink resource for the downlink transmission scheduled using the first FTFR, a respective one of:

receiving the uplink transmission from the wireless communication device using an uplink resource of the STFR; or sending the downlink transmission to the wireless communication device using a downlink resource of the STFR.

11. A wireless communication method, comprising:

sending, by a network to a wireless communication device, first indication indicating a first First Type Frequency Resource (FTFR) and at least one Second Type Frequency Resource (STFR) mapped to the first FTFR, wherein the first indication corresponds to values of a first field in control information received by the wireless communication device from the network; and communicating, by the network with the wireless communication device, using the first FTFR and the at least one STFR mapped to the first FTFR, wherein:

the wireless communication device determines whether the first FTFR comprises an uplink resource for an uplink transmission scheduled using the first FTFR or a downlink resource for a downlink transmission scheduled using the FTFR; and in response to the wireless communication device determining that the first FTFR does not comprise the uplink resource for the uplink transmission scheduled using the first FTFR or the downlink resource for the downlink transmission scheduled using the first FTFR, a respective one of:

receiving the uplink transmission from the wireless communication device using an uplink resource of the STFR; or sending the downlink transmission to the wireless communication device using a downlink resource of the STFR.

12. The wireless communication method of claim 11, wherein communicating using the first FTFR and the at least one STFR mapped to the first FTFR comprises:

sending, by the network to the wireless communication device, control information on the first FTFR, wherein the control information schedules a data transmission on one of the at least one STFR; and one of:

receiving, by the network from the wireless communication device, the data transmission on the one of the at least one STFR; or sending, by the network to the wireless communication device, the data transmission on the one of the at least one STFR.

13. The wireless communication method of claim 11, wherein communicating using the first FTFR and the at least one STFR mapped to the first FTFR comprises:

sending, by the network to the wireless communication device, control information on one of the at least one STFR, wherein the control information schedules a data transmission on the one of the at least one STFR; and one of:

receiving, by the network from the wireless communication device, the data transmission on the one of the at least one STFR; or sending, by the network to the wireless communication device, the data transmission on the one of the at least one STFR.

14. The wireless communication method of claim 11, wherein communicating using the first FTFR and the at least one STFR mapped to the first FTFR comprises:

sending, by the network to the wireless communication device, control information on a second FTFR, wherein the control information schedules a data transmission on one of the at least one STFR; and one of:

receiving, by the network from the wireless communication device, the data transmission on the one of the at least one STFR; or sending, by the network to the wireless communication device, the data transmission on the one of the at least one STFR.

15. The wireless communication method of claim 11, wherein communicating using the first FTFR and the at least one STFR mapped to the first FTFR comprises:

sending, by the network to the wireless communication device, control information on second FTFR, wherein the control information schedules a data transmission on the first FTFR; and one of:

receiving, by the network from the wireless communication device, the data transmission on the one of the first FTFR; or sending, by the network to the wireless communication device, the data transmission on the one of the first FTFR.

16. The wireless communication method of claim 11, further comprising sending, by the network to the wireless communication device, second indication identifying the FTFR, wherein the second indication corresponds to values of a second field in the control information received by the wireless communication device from the network.

* * * * *